ns3,445,168
Patented May 20, 1969

3,445,168
PROCESS AND ELEMENT FOR STRAIN MEASUREMENT
Felix Zandman, Villanova, Pa., and Daniel Post, Sheffield, England, assignors to Vishay Intertechnology, Inc., Malvern, Pa., a corporation of Delaware
No Drawing. Filed Oct. 28, 1965, Ser. No. 505,464
Int. Cl. G01b 11/16
U.S. Cl. 356—32          13 Claims

ABSTRACT OF THE DISCLOSURE

A deformation test device having a flexible metal backing sheet and a finely divided metallic transferable pattern, the method of making this device and the use of the device for making moire fringe measurements are disclosed. The test device is made by establishing a predetermined regular master pattern in a photosensitive medium and forming on a flexible metal backing sheet a thin metallic coating, in a pattern directly related to the master pattern, which is transferable from the metal backing sheet to a test object.

---

This invention relates to the determination and analysis of deformation and strain in test objects. More particularly, the invention relates to the existing method for deformation and strain measurement variously known as the "mechanical interferometry method," the "photoscreen method" and, more commonly, the "moire fringe method." The invention is specifically directed to a new and improved method for applying a precise pattern of desired configuration to an object for use in practicing the moire method.

The moire method is an optical method which determines actual deformation and strain at a particular location on the test object. In practice there is formed in some manner on the surface of the test object, at a location where deformation and strain are to be determined, a precise, regular pattern of desired configuration, usually in the form either of equidistant, parallel lines of uniform width (this pattern commonly being referred to as a "grille"), or of rectangularly-shaped dots on square or rectangular centers (this pattern often being referred to as a rectangular "grid"). As examples, typical grilles and grids may contain from 200 to 5,000 lines, or rows of dots, per inch.

A pattern identical in configuration and dimensions to that formed on the test object also is formed on a transparent sheet of a suitable material such as glass or plastic, which transparency (usually a hard film negative) is used for comparison purposes and is called a "master." After a stress or other phenomenon has produced a deformation in the test object, and consequently a distortion in the pattern formed thereon, this transparent master containing the undistorted pattern is superimposed as near as may be over the distorted pattern on the test object, and the two patterns observed by means of a light source. The superimposition of the undistorted and distorted patterns produces a distinctive optical effect commonly referred to as a moire fringe. By the measurement of certain dimensions of the fringe coupled wtih a mathematical analysis, the deformation and strain at the locations of interest can be determined. The moire fringe method and the manner in which it is applied to measure deformation and strain are more fully described in Experimental Stress Analysis and Motion Measurement, by Dove and Adams (Charles E. Merrill Books, Inc., 1964).

A principal problem which has greatly limited the use of the moire method has been the practical difficulties involved in accurately forming the desired test pattern on the test object. At the present time, grid or grille patterns are applied to test specimens by means such as mechanical ruling, photo-etching, and evaporation of suitable materials through a fine screen of suitable configuration. However, all of these methods are unsatisfactory, either because they are too expensive or too exacting, or because they fail to provide the required quality of test pattern with regard to accuracy and uniformity.

In view of the above, it is a principal object of this invention to provide an improvement in the moire method of deformation and strain determination. Another and more specific object of the invention is to provide an improved technique and device for forming on a test object an accurate, undistorted pattern of any desired configuration for use in practicing the moire method. Still other objects and benefits of the invention will become apparent from the following description of the invention.

In accordance with the present invention, a test pattern of the desired configuration is first removably formed upon a separate backing sheet of suitable material from which it readily can be transferred to the test object without appreciable distortion. This transfer is accomplished by adhering the pattern to the test object by plating or through the use of a suitable adhesive or cement, and, after curing of the cement, peeling off the backing sheet which is readily removable without destroying or appreciably distorting the pattern.

The backing sheet used in the practice of the present invention is a thin sheet of a suitable sheet material such as metal. Stainless steel has been found to give excellent results and is preferred. However, other metals and other materials can on occasion be used. Examples of other suitable materials include aluminum, epoxy and glass. When a metallic backing sheet is employed, suitable thicknesses range from about 0.002 to about 0.020 inch. Backing sheets made from stainless steel are normally used in a thickness of approximately 0.005 inch.

In accordance with the invention there is formed on the backing sheet the desired test pattern for use in conjunction with the moire method. This pattern is not firmly fixed to the backing sheet, however, and once the pattern has been adhered to the test object, the backing sheet readily can be removed as by peeling it off.

In one embodiment of the invention, there is formed on at least one surface of the backing sheet a uniform, thin layer of the metal from which it is desired to fabricate the test pattern. While other metals such as iridium, copper, nickel-copper alloy and silver can be used, nickel has been found to be particularly suitable and its use is preferred for this purpose. When nickel is so employed, layers ranging in essentially uniform thickness from about 0.001 mil to about 1 mil are suitable and can be used, although layers of a thickness in the range of from about 0.01 mil to about 0.25 mil are more frequently employed and are preferred.

The above-mentioned layer of metal can be applied to the backing sheet by any suitable conventional means, such as electroplating, vacuum evaporating, foil cementing and the like. For a general description of the techniques by which a thin layer of one metal may be deposited by electroplating, see Chemical Engineers' Handbook, edited by Perry (McGraw-Hill Book Company, Inc. 1950), pages 1796–1800.

In accordance with a preferred embodiment of the invention, the backing sheet or substrate is provided with a coating of a photosensitive resist material such as Kodak KPR. This photoresist is exposed to light in a pattern corresponding to the negative of the pattern to be established on the body to be investigated. After exposure, the photosensitive resist material is subjected to the action of a suitable developing agent, such for example as Kodak KPR Developer, the resist being hardened in the areas of exposure, and being removed elsewhere. Thereafter, the thin layer of the moire transfer material is applied, preferably by electroplating the backing sheet or substrate in those areas from which the resist material was removed (the unexposed areas), until the desired thickness of the transfer material is established thereon.

In accordance with another embodiment of this invention, after the backing sheet or substrate is provided with a continuous thin layer of a suitable metal, such as nickel, the metal-covered surface is then also coated with a thin adhering film of a suitable photosensitive resist material. Again, a suitable photosensitive resist material is KPR, available commercially. After the photosensitive resist material has been applied, it is light-exposed over the area of the desired pattern of lines or dots. This exposure may be accomplished conveniently through the use of a photographic plate depicting the desired pattern. After exposure, the photosensitive resist material is subjected to the action of a suitable developing agent for photosensitive resist materials, such as that commercially available under the trademark, "KPR Developer." The image of the desired test pattern formed by the action of the developing agent on the photosensitive resist material is further hardened by heat exposure, and thereby rendered immune to certain subsequent etching agents.

The photosensitive resist material and the metal layer around the pattern image are then removed by the action of a suitable etching agent, such as, in the case of nickel, either a ferric chloride solution or an aqueous solution of concentrated nitric and hydrochloric acids. The etching is stopped after the pattern in nickel has been etched out and before the substrate is substantially etched. Etching reagents suitable for use with metals other than nickel also are well known, such as, for example, phosphoric acid. The desired test pattern now has been formed from a suitable metal such as nickel on the face of the backing sheet, and is in condition to be applied to the test object. The techniques and materials for the formation of images through the use of photosensitive resist materials are more fully described in Kodak Photosensitive Resists for Industries by Eastman Kodak Company, Rochester, New York.

The metallic test pattern formed on the backing sheet is directly applied to the test object and made to adhere thereto by means of a suitable adhesive or cement. Cements found to be useful for this purpose include epoxy cements, polyurethane cements, and 9-10 Contact Cement. After curing of the adhesive bond between the metallic pattern and the test object, the thin backing sheet then readily can be peeled off, leaving the undistorted test pattern firmly adhering to the test object. This pattern, in conjunction with an identical master pattern formed on a transparent sheet material, such as glass or plastic, then can be used to observe moire fringe effects resulting from distortion in the test pattern on the test specimen.

If the body to which the metallic pattern is bonded is a transparent body, such as glass or plastic, observation of the moire fringe can best be made by means of transmitted light. In that event the cement which is used in bonding the metallic pattern to the test object preferably should be of a clear or transparent nature. On the other hand, where the moire fringe effect is to be observed by means of reflected light, it is preferred that a blacking pigment be added to the cement in order to establish the desired contrast between the metallic test pattern and the intervening surfaces.

In an illustrative specific example of the second embodiment of this invention, a sheet of stainless steel having uniform thickness of approximately .005 inch is selected as a backing sheet for the practice of the invention. By means of conventional electroplating techniques, there is deposited upon this backing sheet a thin uniform layer of nickel approximating 0.25 mil in thickness. The backing sheet containing the thin layer of nickel then is coated with a thin adhering film of a photosensitive resist material obtained commercially under the trademark, "KPR." After coating, the film of photosensitive resist material is exposed to a light source through a photographic plate depicting the desired pattern. In the example, the pattern preferably consists of a grid of 2000 lines per inch in one direction and 2000 lines per inch in the other direction, these directions being essentially virtually perpendicular. The photosensitive resist material with the desired pattern area exposed is then subjected to the action of a developing agent obtained commercially under the trademark, "KPR Developer." Following exposure and developing, the article then is subjected to etching. Illustrative etching agents are (1) a solution composed of concentrated nitric acid, concentrated hydrochloric acid and water, or (2) a solution of ferric chloride, hydrochloric acid and water. After the article is satisfactorily etched to remove the photosensitive resist materials and nickel layer surrounding the desired pattern, it is then affixed to the test object in the desired location by means of epoxy cement filled with carbon black. Following curing of the adhesive bond for a period of 24 hours at room temperature, for example, the backing sheet of stainless steel readily can be peeled away, leaving the nickel pattern firmly affixed to the test object in the desired location. Faster curing can be obtained by applying heat or using fast-curing epoxies. In the preferred embodiment, the application, exposure and development of the photosensitive resist precedes the electroplating step, rather than succeeding it as in the above example. and the etching step is obviated. The pattern established as described above and transferred to the test object to which it is affixed is substantially undistorted and accurate in every detail with respect to the photographic plate from which it is made. The latter photographic plate can be, and preferably is, used as the master for comparison purposes in measuring deformation and strain in the distorted metallic pattern following application of stress to the test object.

The extremely close correlation between the transferred pattern on the test object and the master achieved by the present invention may be used to advantage by observing the comparison in a camera film plane between the master and the image of the transferred pattern. For this purpose, after the pattern has been bonded to the test object and the substrate has been peeled off, a camera is fixed in position to provide a focused image of the transferred pattern in its film plane, camera position, lens and bellows being so chosen as to produce a focused image in the film plane substantially duplicating the master, which is inserted at said plane. By virtue of the precision afforded by the present process, the substantial duplication of the master and the bonded pattern yields useful indications from every slight deformations.

Other embodiments and applications of this invention will be obvious to those skilled in the art. However, it is to be specifically understood that all such applications and embodiments are contemplated as coming within the scope of the present invention.

What is claimed is:

1. The process for preparing a deformation test device including a flexible metal backing sheet and a finely divided metallic pattern transferable from said flexible metal backing sheet to a test object for moire fringe measurement of the object's deformation, comprising establishing a predetermined regular master pattern photographically reproducible in a photosensitive medium, and forming on said flexible metal backing sheet a very thin metallic coating in a predetermined pattern directly related to said master pattern, the pattern of said very thin metallic coating being determined by a process including applying a coating of photosensitive resist material on said device, exposing said resist layer to a light pattern representative of said master pattern, and developing said resist layer to define the areas in which the metallic coating material is to adhere to said metal backing sheet until transferred to a test object.

2. The process defined in claim 1, wherein the coating material is nickel electroplated on a flexible backing sheet of stainless steel.

3. The process defined in claim 2, wherein the nickel coating comprises a pattern of dots separated by a first set of regularly spaced lines parallel to each other and a second set of regularly spaced lines substantially perpendicular thereto.

4. The process defined in claim 1, wherein the exposure and developing of said resist layer is relied upon to retain resist on those areas of a surface of the device to which the metallic coating material is not to adhere, after which the metallic coating material is applied to the revealed areas of said flexible metal backing sheet by electroplating.

5. The process defined in claim 1, wherein the metallic coating material is electroplated onto the flexible metal backing sheet and the exposure and developing of said resist layer is relied upon to protect the metallic coating in the areas thereof to be retained, after which the unprotected portions of said metallic coating are etched away.

6. In the moire fringe method for the measurement of deformation and strain, the improvement which comprises forming a thin layer of metal on a backing sheet made from a flexible sheet material; coating said layer of metal with a thin adhering film of a photosensitive resist material; light-exposing said photosensitive resist material in the area of a desired pattern; subjecting the film of photosensitive resist material to the action of a photographic developing agent; subjecting the film of photosensitive resist material to the action of an etching agent to remove the unexposed photosensitive resist material and underlying metal layer; adhering the metallic pattern so formed directly to a test object by means of an adhesive agent; and peeling away said backing sheet of flexible sheet material to leave the metallic pattern attached to said test object.

7. In the moire fringe method for the measurement of deformation, the improvement which comprises forming a thin layer of nickel on a backing sheet made from a thin flexible sheet of stainless steel; coating said layer of nickel with a thin adhering film of a photosensitive resist material; light-exposing said photosensitive resist material in the area of a desired pattern; subjecting the film of photosensitive resist material to the action of a photographic developing agent; subjecting the film of photosensitive resist material to the action of an etching agent to remove the unexposed photosensitive resist material and underlying nickel layer; adhering the nickel pattern so formed directly to a test object by means of an adhesive agent; and peeling away said backing sheet of stainless steel to leave the nickel pattern attached to said test object.

8. The process of establishing a moire fringe test in reliance on a deformation test device made as defined in claim 3, comprising cement-bonding the metallic coating of the deformation test device to an object wherein deformation is to be observed, peeling off the flexible backing sheet of the test device to uncover the pattern bonded to the object, positioning a master pattern a distance from said pattern bonded to the object, and focusing onto said master pattern an image of said pattern bonded to the object.

9. A deformation test device consisting of a transferable metallic pattern removably mounted on a flexible metal backing sheet, said article being produced in accordance with the process of claim 1.

10. A deformation test device consisting of a transferable metallic pattern removably mounted on a flexible metal backing sheet, said article being produced in accordance with the process of claim 4.

11. The process defined in claim 4, where the coating is nickel electroplated on a flexible backing sheet of stainless steel.

12. A deformation test device consisting of a transferable nickel pattern mounted on a flexible stainless steel backing sheet, said article being produced in accordance with the process of claim 11.

13. The process of establishing a moire fringe test in reliance on a deformation test device as defined in claim 9, comprising cement-bonding the metallic coating of the deformation test device to an object wherein deformation is to be observed, peeling off the flexible backing sheet of the test device to uncover the pattern bonded to the object, positioning a master pattern a distance from said pattern bonded to the object, and focusing onto said master pattern an image of said pattern bonded to the object.

References Cited

UNITED STATES PATENTS

| | | | |
|---|---|---|---|
| 3,313,204 | 4/1967 | Oppel | 88—14 |
| 3,125,615 | 3/1964 | Redner | 88—14 |
| 2,961,746 | 11/1960 | Lyman | 204—15 |
| 2,874,085 | 2/1959 | Brietzke | 204—15 |
| 2,787,834 | 4/1957 | Shoup | 88—14 |
| 2,666,008 | 1/1954 | Enslein et al. | 204—15 |
| 2,438,205 | 3/1948 | Coates. | |

JOHN H. MACK, *Primary Examiner.*

T. TUFARIELLO, *Assistant Examiner.*

U.S. Cl. X.R.

117—212; 156—8; 204—15